BURNER STRUCTURE AND METHOD
Filed Feb. 2, 1970 5 Sheets-Sheet 1
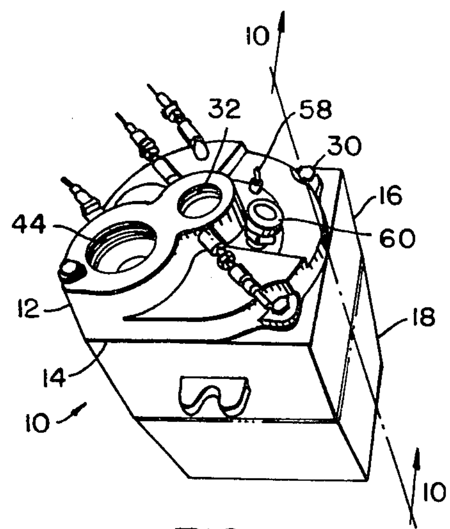
FIG.1
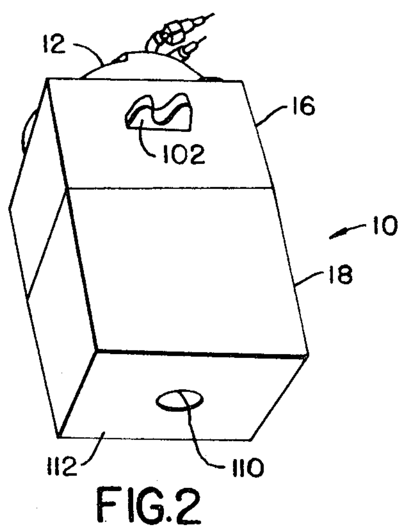
FIG.2
FIG.3
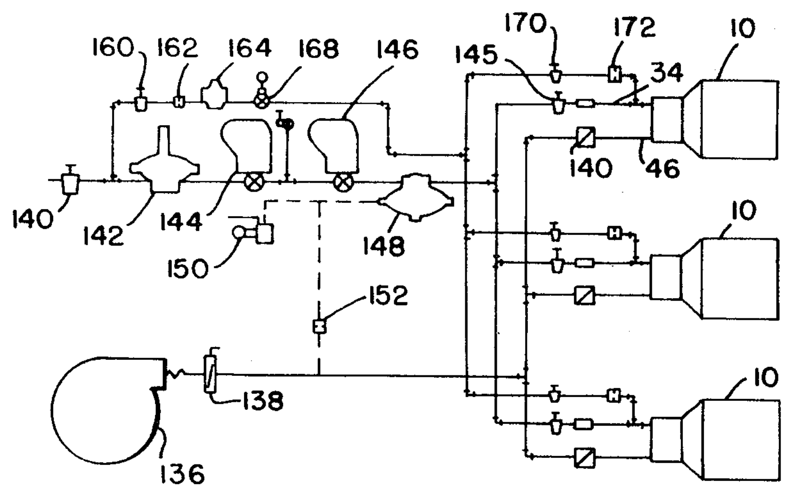
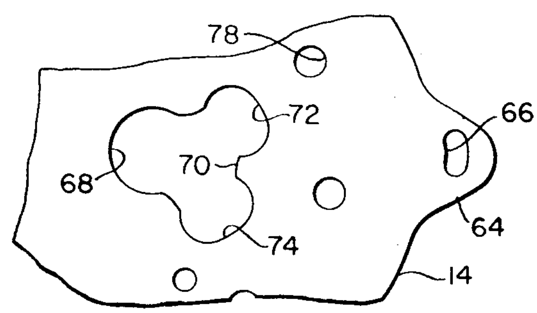
FIG. 11A
INVENTOR.
THEODORE E. DAVIES
BY Whittemore, Hulbert & Belknap
ATTORNEYS

BURNER STRUCTURE AND METHOD

Filed Feb. 2, 1970

INVENTOR.
THEODORE E. DAVIES
BY Whittemore, Hulbert & Belknap
ATTORNEYS

BURNER STRUCTURE AND METHOD

Filed Feb. 2, 1970 5 Sheets-Sheet 3

INVENTOR.
THEODORE E. DAVIES

BY Whittemore, Hulbert & Belknap
ATTORNEYS

BURNER STRUCTURE AND METHOD
Filed Feb. 2, 1970 
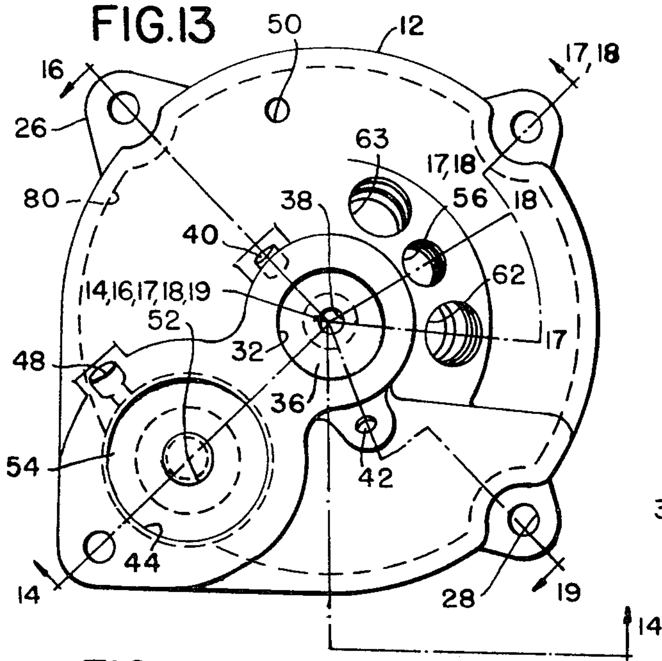
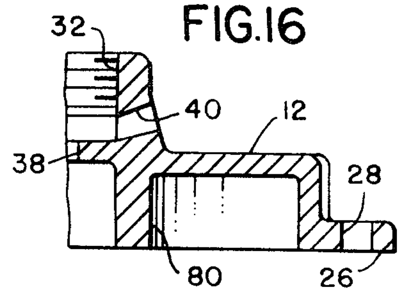
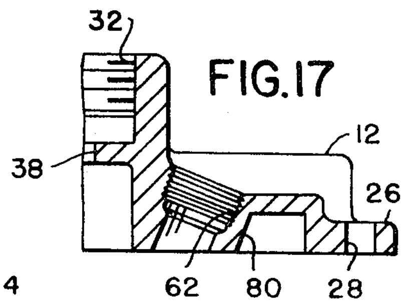
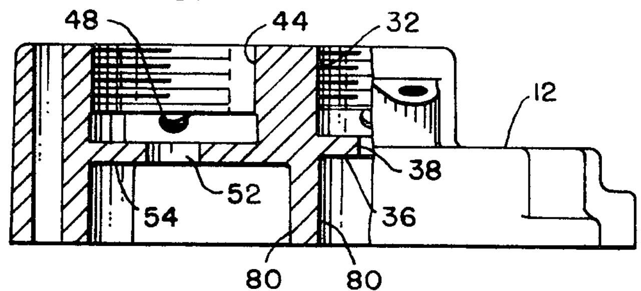
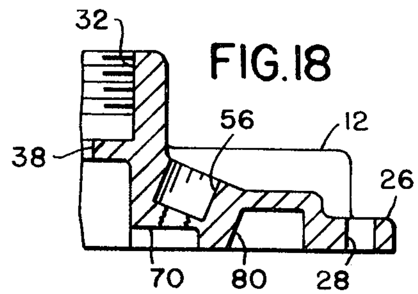
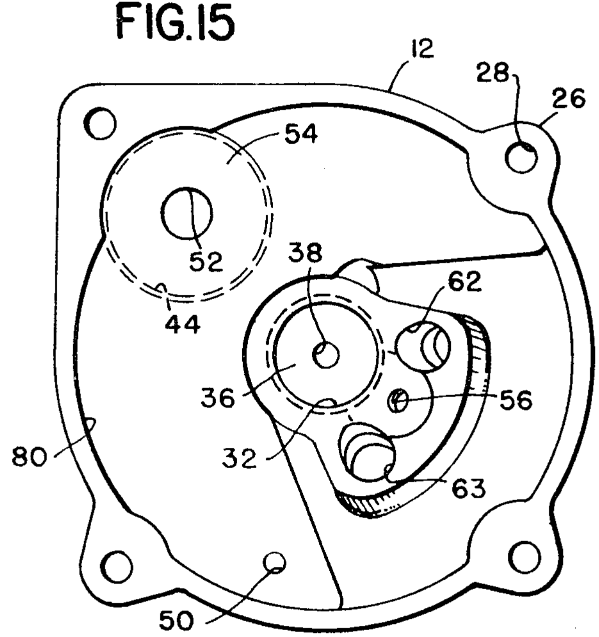
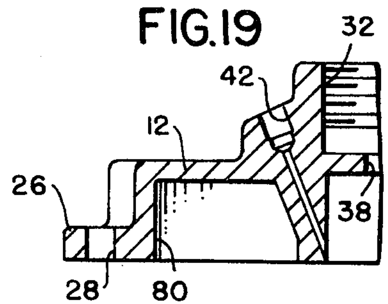
INVENTOR.
THEODORE E. DAVIES
BY Whittemore, Hulbert & Belknap
ATTORNEYS BURNER STRUCTURE AND METHOD
Filed Feb. 2, 1970
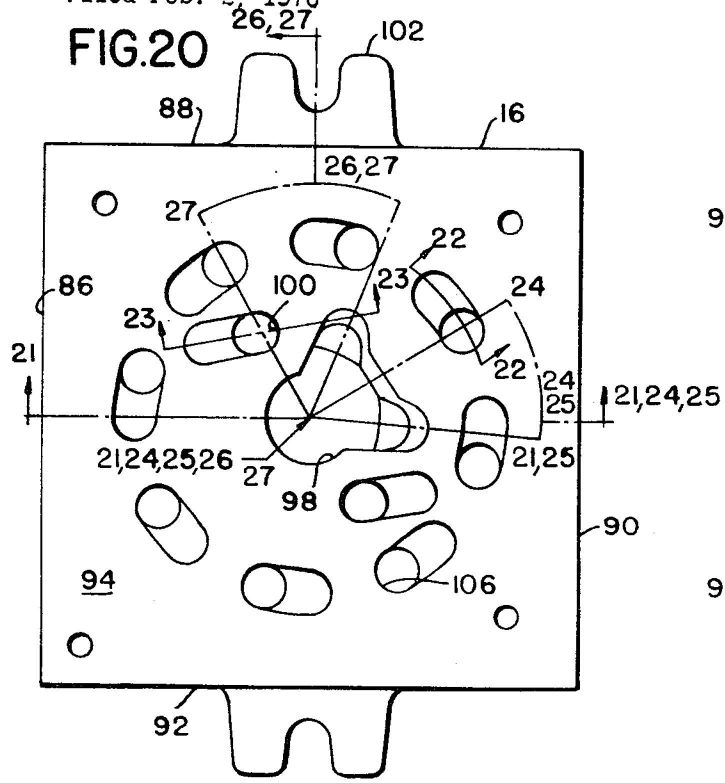
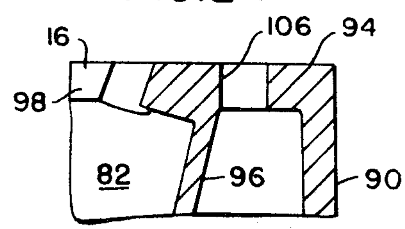
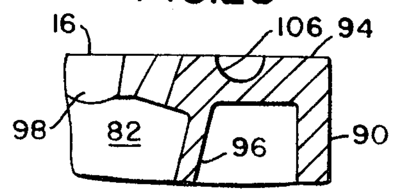
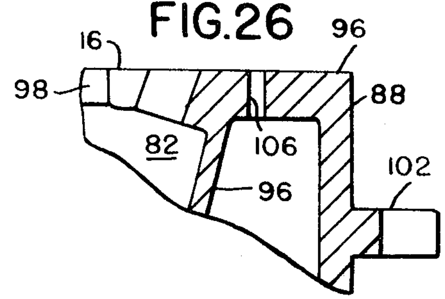
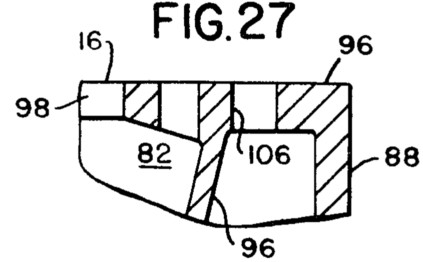
FIG.21
86 106 94 100 98 16 82 96 90 88
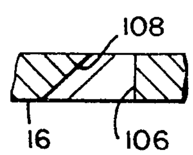
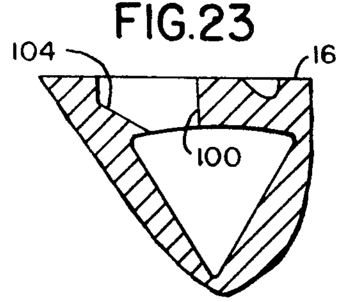
INVENTOR.
THEODORE E. DAVIES
BY Whittemore, Hulbert & Belknap
ATTORNEYS United States Patent Office 3,666,393

Patented May 30, 1972

3,666,393

BURNER STRUCTURE AND METHOD

Theodore E. Davies, Hudson, Ohio, assignor to The North American Manufacturing Company, Cleveland, Ohio Filed Feb. 2, 1970, Ser. No. 7,451
Int. Cl. F23n *3/00;* F23r *1/02*
U.S. Cl. 431—90 14 Claims

ABSTRACT OF THE DISCLOSURE

A burner for heating metal in a furnace or the like including a body member having air and gas metering orifices therein, a tile having an axially extending secondary combustion chamber therein, a tile mounting member secured to one end of the tile providing a primary combustion chamber for the burner and having axially extending openings with slanted sides therethrough extending into the primary combustion chamber and the secondary combustion chamber in the tile, and a gasket positioned between the body member and tile mounting member for directing primary and secondary air through the tile mounting member openings into the combustion chambers in a ratio depending on the area of the openings and imparting a swirl to the air in accordance with the alignment of the openings through the gasket and the openings through the tile mounting member.

Upstream and downstream pressure taps are provided in the body member for ascertaining air and gas flows. A flat annular member having openings therethrough is positioned between the secondary air and the secondary combustion chamber in one modification of the burner disclosed to stabilize the burner flame. The burner may be mounted in the roof, hearth or the wall of a furnace and when mounted in the wall of a furnace, a venturi tile may be positioned axially of the burner to insure high entrainment and recirculation of furnace gases.

BACKGROUND OF THE INVENTION

Field of the invention

The invention relates to burners for use in ceramic or metal heating furnaces or the like and refers more specifically to a burner having primary and secondary combustion chambers with a gasket positioned therebetween for regulating the air-gas ratio in the combustion chambers and the direction of introduction of air into the combustion chambers for producing any desired flame shape and length with a selected air-gas ratio with a minimum number of burner parts requiring a minimum amount of machining.

Description of the prior art

In the usual ceramic or metal heating furnace or kiln it is difficult to penetrate into the center of loads without a high velocity burner. Wherein high velocity burners have been provided in the past, they have not provided maximum flexibility, convenience and efficiency.

Thus, in the past many furnaces have used large amounts of cold excess air or high temperature recirculating fans. Further, prior high velocity burners have been subject to small tile cracks in the exposed surface thereof permitting hot burner products to escape through the cracks which tend to overheat the surrounding area and often have had overheated tile surfaces. Metering in prior high velocity burners has usually been external of the burners and they have not been easily mounted in both a horizontal and vertical position in a furnace with simple piping and standard control systems. The prior high velocity burners have also been generally incapable of operating at high excess air or excess fuel ratios or have not had sufficient penetration with ease of lighting using standard fuels safely.

SUMMARY OF THE INVENTION

The invention is a nozzle mix burner designed for high penetration into loads that would otherwise be difficult to heat in the center. The burner of the invention includes a body having air and gas metering orifices which are tapped upstream and downstream to permit air and gas flows to be ascertained, a tile having an axially extending secondary combustion chamber therein and a tile mounting member secured to one end of the tile having a cup therein forming a primary combustion chamber axially aligned with the secondary combustion chamber secured to the tile mounting member. The tile mounting member further has primary and secondary air openings extending therethrough having a sloped side for passing air into the primary and secondary combustion chambers.

The burner further includes a gasket positioned between the body member and tile mounting member having openings therethrough for regulating the air-gas ratio in the primary and secondary combustion chambers in accordance with the cross sectional area thereof and positioned to control the direction of air passed into the primary and secondary combustion chambers in accordance with their alignment with the openings through the tile mounting member.

A flame stabilizing member is secured to the tile mounting member in one modification of the invention so as to be between the secondary air openings and the secondary combustion chamber formed in the tile on assembly of the tile mounting member and tile for stabilizing the flame in the secondary combustion chamber.

The burner of the invention may be installed in either the roof or the side wall of a furnace. When installed in a furnace having a thick side wall, a venturi tile may be provided axially of the burner to insure high furnace gas entrainment and recirculation.

BRIEF DESCRIPTION OF THE DRAWINGS

FIG. 1 is a perspective view of one end and two sides of the burner of the invention.

FIG. 2 is a perspective view of the other end and one other side of the burner of FIG. 1.

FIG. 3 is a schematic diagram of an installation of the burner illustrated in FIG. 1.

FIG. 10 is an enlarged longitudinal section view of the burner of FIG. 1 taken substantially on the line 10—10 in FIG. 1.

FIG. 11A is a partial plan view of a modified gasket for use in the burner structure of FIG. 1, illustrating arcuately extending openings therethrough to permit relative rotation between the gasket and tile mounting member whereby alignment between the openings in the gasket and tile mounting member may be varied.

FIG. 13 is an enlarged top view of the body member of the burner in FIG. 1.

FIG. 15 is an enlarged bottom view of the body member of the burner illustrated in FIG. 1.

FIGS. 16, 17, 18 and 19 are partial section views of the body member illustrated in FIG. 13 taken on the lines 16—16, 17—17, 18—18 and 19—19 respectively.

FIG. 20 is an enlarged top view of the tile mounting member of the burner illustrated in FIG. 1.

FIG. 21 is a section view of the tile mounting member illustrated in FIG. 1 taken substantially on the line 21—21 in FIG. 20.

FIGS. 22, 23, 24, 25, 26 and 27 are partial section views of the tile mounting member illustrated in FIG. 1 taken substantially on the lines 22—22, 23—23, 24—24, 25—25, 26—26 and 27—27 in FIG. 20.

DESCRIPTION OF THE PREFERRED EMBODIMENTS

Figure 4:
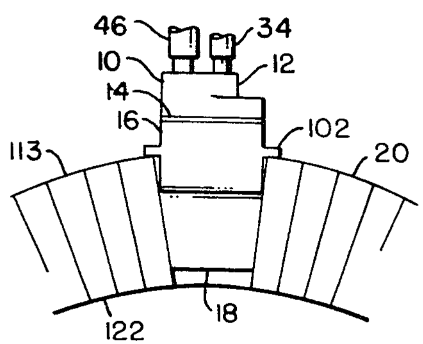
FIG. 4 is a diagrammatic illustration of the burner illustrated in FIG. 1 installed in an arched furnace roof.

The burner 10 illustrated in FIG. 1 includes a body member 12, a gasket 14, a tile mounting member 16 and a tile 18.

Figure 6:
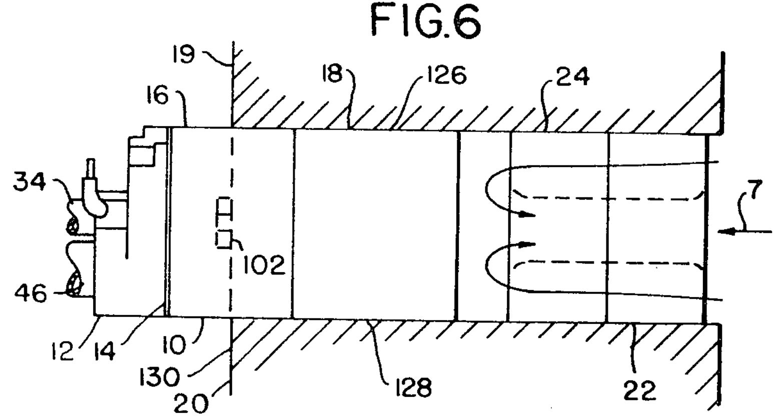
FIG. 6 is a diagrammatic illustration of the burner illustrated in FIG. 1 installed in the wall of a furnace in conjunction with a venturi.

With the burner 10 installed in a horizontal position in the wall 19 of a furnace 20 as illustrated particularly in FIG. 6, a venturi structure 22 made up of individual venturi tiles 24 is provided in conjunction with the burner 10 to insure high entrainment and recirculation of furnace gases even in furnaces with very thick walls.

The body member 12 illustrated in more detail in FIGS. 13 through 19 is a generally cylindrical member having the mounting ears 26 thereon in angularly spaced apart locations thereabout having holes 28 therethrough through which bolts 30 extend for securing the body member 12 to the tile mounting member 16 with the gasket 14 therebetween.

A threaded opening 32 is provided in the top of the body member 12 to which a gas supply line 34 shown best in FIG. 3 is secured. The threaded opening is terminated by an integral metering disc 36 having the metering orifice 38 therein as shown best in FIG. 14.

Threaded openings 40 and 42 illustrated better in FIGS. 16 and 19 respectively are provided in the body member 12 for attachment of the opposite ends of a pressure indicating manometer upstream of the orifice 38 in the case of the opening 40 and downstream of the orifice 38 in the case of the threaded opening 42.

The threaded opening 44 permits connection of an air line 46, again shown best in FIG. 3, to the body member 12. Again, threaded openings 48 and 50 are provided through the body member 12 upstream and downstream respectively of the air metering orifice 52 formed in the integral disc 54 in the opening 44 to permit connection of a manometer thereto for determination of airflow past the orifice 52.

A separate threaded opening 56 is provided in the body member 12 to receive an igniter spark plug 58 shown in FIG. 1 and an observation port 60 is provided in the threaded opening 62 in the body member 12 to permit viewing combustion in the burner 10. The openings 56 and 62 are illustrated in more detail in FIGS. 17 and 18. A separate opening 63 on the opposite side of the spark igniter opening 56 from the observation port opening 62 may be provided for a fire safety plug, if desired.

In operation, gas and air under a predetermined pressure are metered through the orifices 38 and 52. Any desired air-gas ratio may be maintained by maintaining selected relative pressure drops across the orifices 38 and 52 which may be monitored by manometers connected to the upstream and downstream air openings 48 and 50 and to the upstream and downstream gas openings 40 and 42, respectively.

Figures 11, 12, 28, 29:
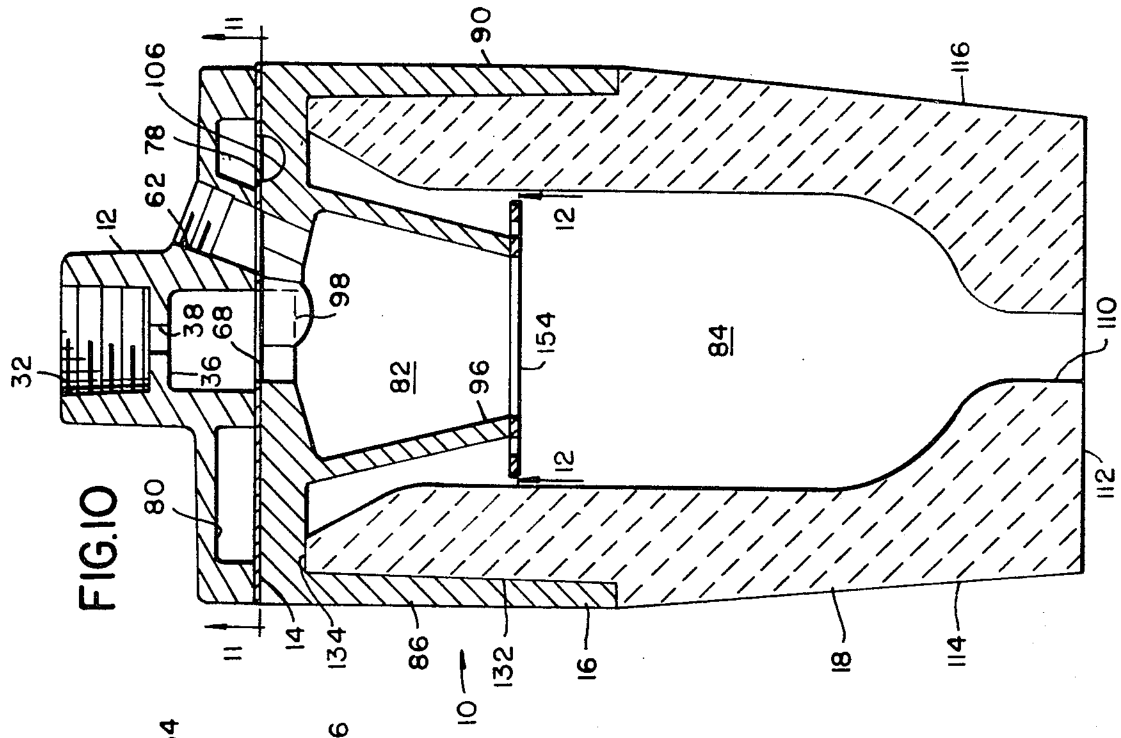
FIG. 11 is a cross section view of the burner of FIG. 1 taken substantially on the line 11—11 in FIG. 10.
FIG. 12 is a cross section view of the burner of FIG. 10 taken substantially on the line 12—12 in FIG. 10.
FIG. 28 is a partial cross section view of the burner of FIG. 1 similar to a portion of the cross section view of FIG. 10 and illustrating a modified flame stabilizer structure.
FIG. 29 is a bottom view of the modified flame stabilizer structure illustrated in FIG. 28 taken substantially on the line 29—29 in FIG. 28.

The gasket 14, best shown in FIG. 11, is preferably asbestos and again includes the mounting ears 64 thereon having openings 66 therethrough. Openings 66 are aligned with the mounting ears 26 and openings 28 in the body member 12 to permit passage of bolts 30 therethrough.

A central opening 68 is provided extending through the gasket 14 beneath the gas metering orifice 38 to permit passage of the gas metered through orifice 38 therethrough. Opening 68 has the additional arcuate openings 70, 72 and 74 therethrough connected to opening 68 into which the firing end of the spark igniter 58, the observation port 60 and the flame detection device, should one be provided, extend.

Two primary air openings 76 extend through the gasket 14 radially outwardly of the opening 68 at the same radial distance from the center of opening 68 as shown in FIG. 11. A plurality of secondary air openings 78 extend through the gasket 14 at the same radial distance from the center of the opening 68 and radially outwardly of the openings 76, again as shown best in FIG. 11.

The openings 76 pass air from the annular channel 80 in the body member 12 into the primary combustion chamber 82 in the tile mounting member 16 as best shown in FIG. 21. The secondary air openings 78 pass air into the secondary combustion chamber 84 formed within the tile 18 below the primary combustion chamber 82 as shown best in FIG. 10.

The tile mounting member 16, as shown best in FIGS. 20 through 27, is generally rectangular, having the four sides 86, 88, 90 and 92, and the top 94. The cup 96 is suspended from the top 94 of the tile mounting member 16 beneath the central opening 98 in the top and encompassing the primary air openings 76 to form the primary combustion chamber 82 as illustrated best in FIG. 21.

Mounting ears 102 are provided on the opposite sides 88 and 92 of the tile mounting member 16 as shown best in FIG. 20 to facilitate mounting the burner 10 in a furnace 20.

The primary air openings 100 provided in the top 94 of the tile mounting member 16 have a cross section as shown in FIG. 23 and are positioned to receive air through the air opening 76 in the gasket 14 and pass it into the primary combustion chamber 82. It will be particularly noted that the openings 100 have one sloped side 104.

The secondary air openings 106 provided in the tile mounting member 16 are again positioned radially outwardly of the primary air openings 100 and are concentric with the central opening 98 through the tile mounting member 16. Again, the secondary air openings 106 have one sloped side 108 as shown best in FIG. 22. The openings 106 are located to direct air received through the gasket 14 into the secondary combustion chamber 84.

In operation, depending on the alignment of the openings 76 and 78 in the gasket 14 with the openings 100 and 106 in the tile mounting member 16, air passed through the openings will enter the combustion chambers either axially or with more or less swirl or tangential movement with the tangential movement being more pronounced as the air passing through the openings 76 and 78 are directed onto the sloping sides of the openings 100 and 106. The shape and length of the flame in the primary and secondary combustion chambers can thus be controlled by controlling the alignment of the gasket 14 and the tile mounting member 16.

While a fixed gasket 14 is illustrated in FIG. 11, an adjustable gasket to vary the alignment of the primary and secondary air openings in the gasket 14 and the tile mounting member 16 could be provided by, for example, providing arcuate circumferential slots on the gasket 14 rather than the openings 66 in the mounting ears 66 and similarly lengthening the openings 70, 72 and 74 arcuately about the center of the opening 68, as shown in FIG. 11A.

Figure 8:
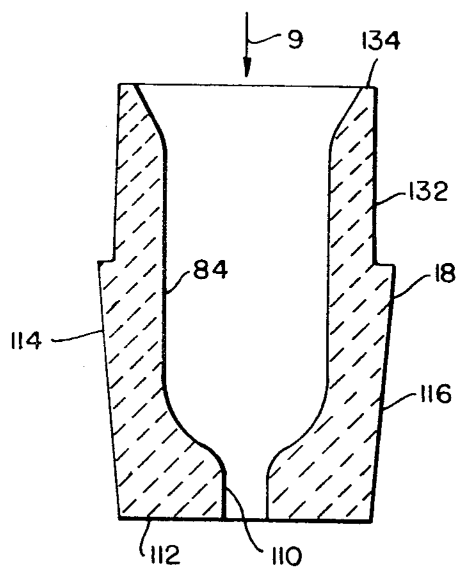
FIG. 8 is an enlarged longitudinal section view of the tile member of the burner of FIG. 1.
Figure 9:
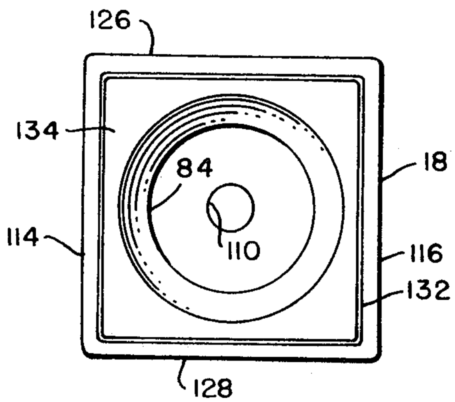
FIG. 9 is an end view of the tile member illustrated in FIG. 8 taken in the direction of arrow 9 in FIG. 8.

The tile 18 as best shown in FIGS. 8 and 9 is an elongated member of refractory material which is generally rectangular in form and which has the axially extending secondary combustion chamber 84 therein. A restricted opening 110 is provided at the end 112 thereof through which the combustion products of the secondary combustion chamber are blown from the burner 10 at a particularly high velocity to heat material in the furnace 20 in which the burner 10 is installed.

Figure 5:
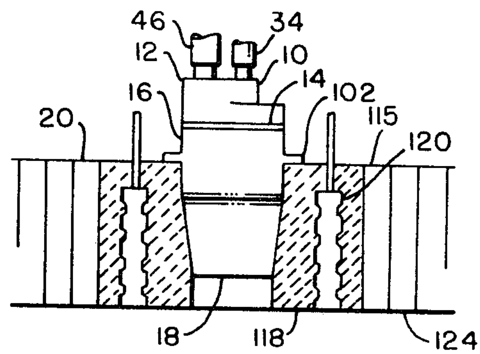
FIG. 5 is a diagrammatic illustration of the burner of FIG. 1 installed in a flat furnace roof.

The two sides 114 and 116 of the tile 18 are tapered as shown in FIG. 8 to permit ready installing of the burner 10 in the arched roof 113 of furnace 20, as particularly shown in FIG. 4. Installation of the burner 10 in furnaces 20 having flat roofs 115 as shown in FIG. 5 should be with the aid of fire-resistant cement 118 and hangers 120. The mounting ears 102 on the burner 10 limits the insertion of the burner into furnaces 20 to prevent overheating of the tile mounting member 14.

The other two sides 126 and 128 are flat and facilitate mounting the burner 10 in the side wall 130 of a furnace as illustrated in FIG. 6. Again, the ears 102 prevent insertion of the burner 10 too far into the side wall 130.

The tile 18 is secured to the tile mounting member 16 by convenient means such as by casting the inside of the tile mounting member 16 as rough as possible and providing the recess 132 around the end 134 of the tile 18 to closely receive the member 16.

In overall operation of the burner 10 assembled as illustrated best in FIG. 10, air at a regulated pressure from a blower 136 is passed through a main control butterfly valve 138, which may be either motorized or manual, through the air line 46 and through the butterfly air valve 140 into the threaded opening 44 in the body member 12, past the orifice 52 and into the channel 80 where it is passed through the openings 76 and 78 and the openings 100 and 106 in gasket 14 into the primary and secondary combustion chambers 82 and 84 respectively.

The desired primary to secondary air ratio may be established by the relative cross sectional areas of the openings 76 and 78 in the gasket 14. Again, the direction of entry of the air into the primary and secondary combustion chambers may be controlled by the alignment of the openings 76 and 78 in the gasket 14 and the openings 100 and 106 in the tile mounting member 16 having the sloped sides 104 and 108.

Gas, which may be natural or propane, is passed from the main gas shutoff valve 140 through the main gas pressure regulator 142, the safety shutoff valves 144 and 146, into the gas line 34 and into the threaded opening 32 in the body member 12 past gas cock 145. The gas is then metered through the orifice 38 into the primary combustion chamber 82 where it may be ignited by a spark from the igniter 58. If desired, an atmospheric regulator 148, a motorized bleed valve 150 and an impulse line orifice 152 may be provided between the air line 46 and the gas line 34 as shown best in FIG. 3.

The gas and air mixture in the primary combustion chamber 82 after combustion is forced out of the cup 96 and into the secondary combustion chamber 84 wherein they are mixed with the secondary air and further combustion thereof occurs. The combustion products of the secondary combustion is then forced out of the opening 110 in the title 18 at a high velocity to provide a high velocity flame in the furnace from the burner 10.

If it is desired to stabilize the flame in the secondary combustion chamber 84, the flame stabilizer member 154 may be secured to the bottom of the cup 96 as illustrated in FIG. 10. The flame stabilizer member 154 is an annular, flat member which may or may not have the openings 156 therein which control the entrance of the secondary air into the secondary combustion chamber 84 to stabilize the combustion therein and enable very high combustion rates in the tile 16.

In the modified structure of FIGS. 28 and 29, the flame stabilizer member 180 is solid and is tilted with respect to the axis of the tile mounting member. The tilted flame stabilizer member 180 is then welded to the tile mounting member at one point on the inner periphery thereof and is secured to the tile mounting member in spaced relation thereto at equal angular distances from the weld by means of spacers 182 welded to both the stabilizing member 180 and to the mounting member.

The tilted flame stabiilzer member allows high airflow at the bottom of the stabilizer for high gas flow. The piloting flame is under this condition held at the bottom, beneath the lower portion of the flame stabilizer plate. At lower gas flow, the pilot flame is held at the top, beneath the upper portion of the flame stabilizer plate. A very high gas turndown range with full air pressure throughout the range results. For example, gas may be throttled from 1,200 cubic feet per hour to 20 cubic feet per hour while air is held at 600 cubic feet per hour on a two-inch burner.

Figure 7:
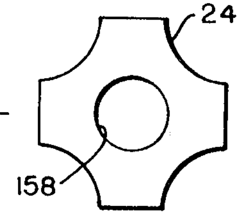
FIG. 7 is an end view of the venturi illustrated in FIG. 6 taken in the direction of arrow 7 in FIG. 6.

When the burner 10 is installed horizontally in a wall 130 of a furnace 20 as illustrated in FIG. 6, the venturi tile 24, placed with the central opening 158 thereof in alignment with the opening 110 from the burner 10 and constructed in the configuration shown in FIG. 7, insure high entrainment and recirculation of furnace gases even in furnaces with very thick walls.

In starting the burner 10, a gas pilot starting system is provided as shown in FIG. 3 including a gas pilot cock 160, a pilot metering orifice 162, a pilot pressure regulator 164, a pilot solenoid valve 168, a pilot gas cock 170 and a pilot burner orifice 172 connected in series between the gas line downstream of the main gas shutoff valve and upstream of the burner 10 as shown in FIG. 3.

There is thus provided a high-velocity gas burner including no moving parts requiring a minimum of machining wherein the ratio of primary to secondary air may be readily determined as by the relative total area of the primary air gasket holes and the secondary air gasket holes and in which the type of flame, that is, the shape or angle and the speed with which the air and gas mix, including the tolerance of excess air and excess gas is controlled by controlling the ratio of primary to secondary air and the amount of spin on the primary and secondary air with a burner tile of a single shape.

While the burner 10 specifically disclosed is a high-velocity, high-excess air burner, the principle disclosed are applicable to other types of burners such as: (1) a flat-flame burner which produces a pancake-shaped flame; (2) a luminous-flame burner which dissociates some of the gas in the center of the flame to free hydrogen and free carbon, the latter producing a yellow, luminous, radiating flame; (3) an immersion tube burner which produces a short high-intensity flame in a tube submerged in a liquid; (4) a radiant tube burner which produces a long, slow-burning flame for heating 1500° to 1900° F. radiant tubes evenly; and (5) a low-velocity, high-excess air burner. These five burner types would not use the tile 18 shown. They would, however, use the gasket-cast, tapered-hole combination to achieve the desired amount of spin and primary to secondary air ratio.

What I claim as my invention is:

1. A burner comprising a body member including means for introducing fuel and air into the burner, a mounting member having a top wall, openings extending through the top wall of the mounting member having at least one sloping side, a gasket positioned between the body member and mounting member extending coextensively with at least part of said top wall and having openings therethrough corresponding to the openings in the top of the mounting member for regulating the air passed through the body member and the gasket into the mounting member for producing a desired flame with a selected air gas ratio and imparting a tangential spin to the air passed from the body member through the gasket into the mounting member.

2. Structure as set forth in claim 1 and further including means in the body member for connecting air and gas pressure analyzing apparatus to the body member upstream and downstream of at least one of the air and gas introduced into the burner.

3. Structure as set forth in claim 1 wherein the burner has an axis and further including a venturi tile positioned in spaced relation to and axially of the burner having a cross-like cross section and a central opening therethrough extending coaxially with the axis of the burner.

4. Structure as set forth in claim 1 wherein the mounting member includes means defining a primary combustion chamber and further including a tiled mounted on the mounting member which tile defines a secondary combustion chamber and wherein the openings through the body member and gasket divide the air into primary and secondary air for passage into the primary and secondary combustion chambers.

5. Structure as set forth in claim 4 wherein the primary combustion chamber is defined by a cup-shaped portion of the mounting member extending into one end of the tile which cup-shaped member also defines a passage for the secondary air between the outer periphery thereof and the one end of the tile.

6. Structure as set forth in claim 5 and further including a flame stabilizing annulus secured to the end of the cup-shaped portion of the mounting member within the one end of the tile.

7. Structure as set forth in claim 6 wherein the burner has an axis and the annulus is inclined with respect to the axis of the burner and is in engagement with the end of the cup-shaped portion of the mounting member only at one point therearound.

8. Structure as set forth in claim 1 wherein means are provided for angularly rotating one of the gasket and mounting member of the burner relative to the other to change the alignment of the openings in the gasket with the openings in the top of the mounting member.

9. A burner comprising a body member including means for introducing fuel and air into the burner, a tile defining a secondary combustion chamber in which the fuel and air are burned, a tile mounting member for mounting the tile in a furnace or the like having a top and openings through the top through which air is passed into the tile, said tile mounting member including a portion defining a first combustion chamber extending into the tile and also defining with the tile a passage for air between the tile mounting member and tile into the secondary combustion chamber in the tile and a gasket positioned between the body member and the tile mounting member having openings therethrough aligned with the openings through the tile mounting member.

10. Structure as set forth in claim 1 and further including means in the body member for connecting air and gas pressure analyzing apparatus to the body member upstream and downstream of at least one of the air and gas introduced into the burner.

11. Structure as set forth in claim 1 wherein the burner has an axis and further including a venturi tile positioned in spaced relation to and axially of the burner having a cross-like cross section and a central opening therethrough extending coaxially with the axis of the burner.

12. Structure as set forth in claim 9 and further including a flame stabilizing annulus secured to the portion of the tile mounting member defining the first combustion chamber.

13. Structure as set forth in claim 12 wherein the burner has an axis and the annulus is inclined with respect to the axis of the burner and in engagement with the tile mounting member only at one point therearound.

14. Structure as set forth in claim 9 wherein means are provided for angularly rotating one of the gasket and tile mounting member of the burner relative to the other to change the alignment of the openings in the gasket with the openings in the top of the tile mounting member.

References Cited

UNITED STATES PATENTS

| | | | |
|---|---|---|---|
| 538,155 | 4/1895 | Crawford | 431—353 |
| 1,841,169 | 1/1932 | Butz | 431—353 X |
| 2,011,283 | 8/1935 | Huff | 431—116 |
| 2,806,517 | 9/1957 | Te Nuyl | 431—353 X |
| 2,918,117 | 12/1959 | Griffin | 431—116 |
| 2,973,808 | 3/1961 | Fox, Jr. | 431—116 |
| 3,091,283 | 5/1963 | Kidwell | 431—90 X |
| 3,209,811 | 10/1965 | Strang | 431—90 X |
| 3,256,924 | 6/1966 | Campbell et al. | 431—182 X |
| 3,371,699 | 3/1968 | Riot | 431—90 X |
| 3,531,229 | 9/1970 | Berglund | 431—158 X |

CHARLES J. MYHRE, Primary Examiner

U.S. Cl. X.R.

431—158, 353